United States Patent [19]

Norberg et al.

[11] 4,220,240
[45] Sep. 2, 1980

[54] METHOD AND MACHINE FOR CONTINUOUSLY TRANSPORTING STARTING SHEETS

[75] Inventors: Gustav S. I. Norberg; Kjell E. L. Segerström, both of Karlstad, Sweden

[73] Assignee: C. J. Wennberg AB, Karlstad, Sweden

[21] Appl. No.: 837,356

[22] Filed: Sep. 28, 1977

[30] Foreign Application Priority Data

Oct. 2, 1976 [DE] Fed. Rep. of Germany ....... 2644632

[51] Int. Cl.² ...................... B65G 17/32; B65G 47/24
[52] U.S. Cl. .................................. 198/408; 198/473; 198/681; 271/204
[58] Field of Search ............... 198/342, 406, 407, 408, 198/473, 678, 681, 683, 793, 800, 802, 836, 409; 271/204, 206, 277

[56] References Cited

U.S. PATENT DOCUMENTS

| | | | |
|---|---|---|---|
| 1,540,687 | 6/1925 | Feistel et al. | 271/204 |
| 1,809,137 | 6/1931 | Miller | 198/473 |
| 2,006,844 | 7/1935 | Smith | 198/408 |
| 2,583,847 | 1/1952 | Hummel | 198/681 |
| 2,795,861 | 6/1957 | Black | 271/206 |
| 2,813,498 | 11/1957 | Senzani | 198/681 |
| 3,088,610 | 5/1963 | Pianowski | 198/342 |
| 3,410,387 | 11/1968 | Wennberg et al. | 198/409 |
| 3,713,648 | 1/1973 | Spika | 271/206 |
| 3,910,424 | 10/1975 | Kawahara | 271/204 |
| 4,069,925 | 1/1978 | Ahokas et al. | 198/473 |

FOREIGN PATENT DOCUMENTS

| | | | |
|---|---|---|---|
| 944383 | 3/1974 | Canada | 198/473 |
| 310310 | 3/1930 | United Kingdom | 271/204 |

*Primary Examiner*—James L. Rowland
*Attorney, Agent, or Firm*—Craig & Antonelli

[57] ABSTRACT

A method and a machine for continuously transferring starting sheets for the electrolytic refining of metals, particularly copper, from the horizontal into the vertical position for introduction into a stand in which the starting sheets are stored for subsequent suspension at equal intervals in the electrolytic refining baths, the sheets being taken up by their cathode bars and being advanced continuously at a substantially uniform speed along a path of movement which changes continuously from the horizontal to the vertical and are successively raised over the transition in the path of movement from the horizontal to the vertical.

7 Claims, 7 Drawing Figures

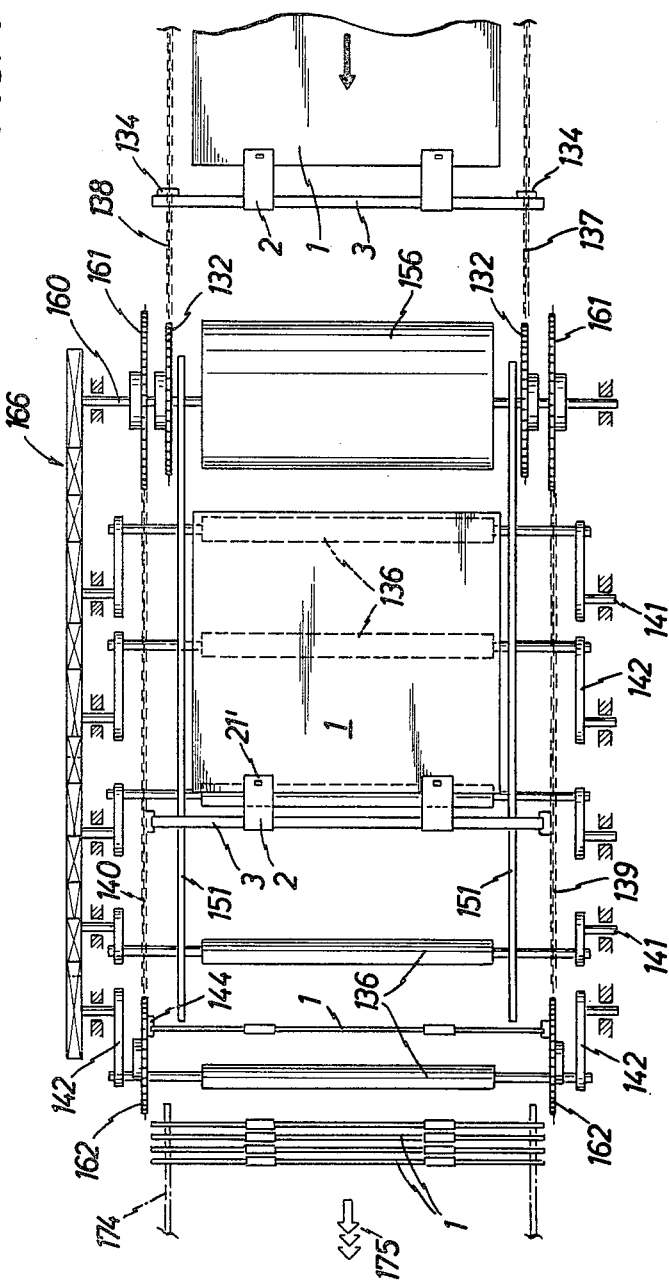

METHOD AND MACHINE FOR CONTINUOUSLY TRANSPORTING STARTING SHEETS

This invention relates to a method of and a machine for continuously transferring and transporting starting sheets for the electrolytic refining of metals, particularly copper, from the horizontal position into the vertical position for introduction into a stand in which the starting sheets are stored for subsequent suspension at equal intervals in the electrolytic refining baths.

The 0.5 to 1 mm thick starting sheets of pure metal, particularly copper, which are fixed to cathode bars through supporting eyes represent cathode units for electrolytic refining which is carried out in baths, the impure metal being dissolved in the form of anodes by means of direct current and being deposited as pure metal onto cathodes, i.e. onto the starting sheets. The anodes and cathodes are arranged in sets in the baths so that every second unit is an anode and, in between, a cathode, the interval between them remaining constant. The quality of the finished cathodes is largely determined by the quality of the starting sheets forming the cathode unit. For example, an incorrectly positioned starting sheet can short circuit the electrolyte bath, increase the risk of sludge contamination and, in addition, can influence the quality of the deposited metal on account of uneven current density.

Since they are vertically suspended in the electrolytic refining baths, the starting sheets provided with supporting eyes and cathode bars in the horizontal position have to be transferred from their horizontal position into the vertical position. Machines are known (German Patent No. 1,533,438) for transferring the starting sheets produced in a horizontal position from their horizontal position into the vertical position and for introducing them into special storage stands where they automatically receive the same spacing which they subsequently retain in the electrolyte bath. The transfer of the thin starting sheets from the horizontal position into the vertical position is a delicate process which requires special arrangements and supports for the starting sheets to ensure that they are not deformed during the transfer movement.

In the machines known from German Patent No. 1,533,438, the starting sheets moving along in a horizontal position are placed on a table which is hydraulically turned in such a way that the sheets are transferred upwards in a forward or rearward direction into the vertical position about a fixed axis of rotation which is directed perpendicularly of the forward movement of the sheets. During this movement, the cathode bars move upwards and are taken up and transported by a conveyor arrangement. After the table has transferred one such sheet into the vertical position, it returns to the horizontal position to receive the next sheet. This transfer operation involves at least two movements and takes so much time that the above-described transfer of the sheets generally determines the output of the entire installation for producing starting sheets.

The object of the present invention is to simplify the transfer of the starting sheets from their horizontal position into the vertical position and to obtain an increase in the output of the entire production plant for the starting sheets, particularly the machine described in German Auslegeschrift No. 2,618,679 for the continuous mechanical fabrication of starting sheets for the electrolytic refining of metals, particularly copper. According to the invention, this object is achieved by the process steps described below.

This process has been mostly further developed to the extent that the drive for raising the starting sheets and the drive for the displaceable supports takes place in synchronism with the drive of the machine for arranging the cathode bars on the sheets and transporting them in the horizontal position. It is also of advantage for the three drives to be interconnected in force-locking, but preferably in form-locking manner.

According to the invention, a machine suitable for carrying out the method according to the invention is distinguished by the fact that the starting sheets with their cathode bars are suspended from catches arranged on endless chain drives, the cathode bars being guidable from a horizontal into a vertical direction of movement along arcuate guide paths. In a further development of this machine, moveable supports for the sheets are provided in the form of rollers secured on both sides to two endless chain drives, these chain drives in the elevated position of the sheets being guided in accordance with the chain drive for elevating the sheets. In this connection, it is best for the rollers to be rotatably mounted in supporting stands on their chain drives. In one preferred embodiment, the catches are shaped in such a way that they take up the cathode bars at the input end of the starting sheet raising unit and release them again at the output end thereof.

In addition, it can be of advantage to provide a common chain drive for transporting the sheets through the unit for mounting the cathode bars on the sheets and through the unit for raising the sheets from the horizontal into the vertical position.

According to the invention, therefore, the starting sheet, after it has been provided with supporting eyes, is brought by a forward and upward movement from its horizontal position into the vertical position from which it is further transported in known manner. In this respect, the invention is essentially characterised in that the cathode bar of the starting sheet is made to follow this path of movement while it is being raised in a simple manner, preferably using a supporting system which forms a flat substrate for the thin sheet while it is being raised and is moved synchronously therewith. In addition, in contrast to known methods, this measure can be carried out continuously and synchronously together with the horizontally acting transporting unit for the starting sheet during application of the cathode bar. Accordingly, the same drive source may be used for both units.

Examples of embodiment of the invention are described in detail in the following with reference to the accompanying diagrammatic drawings, wherein.

Figure 1:
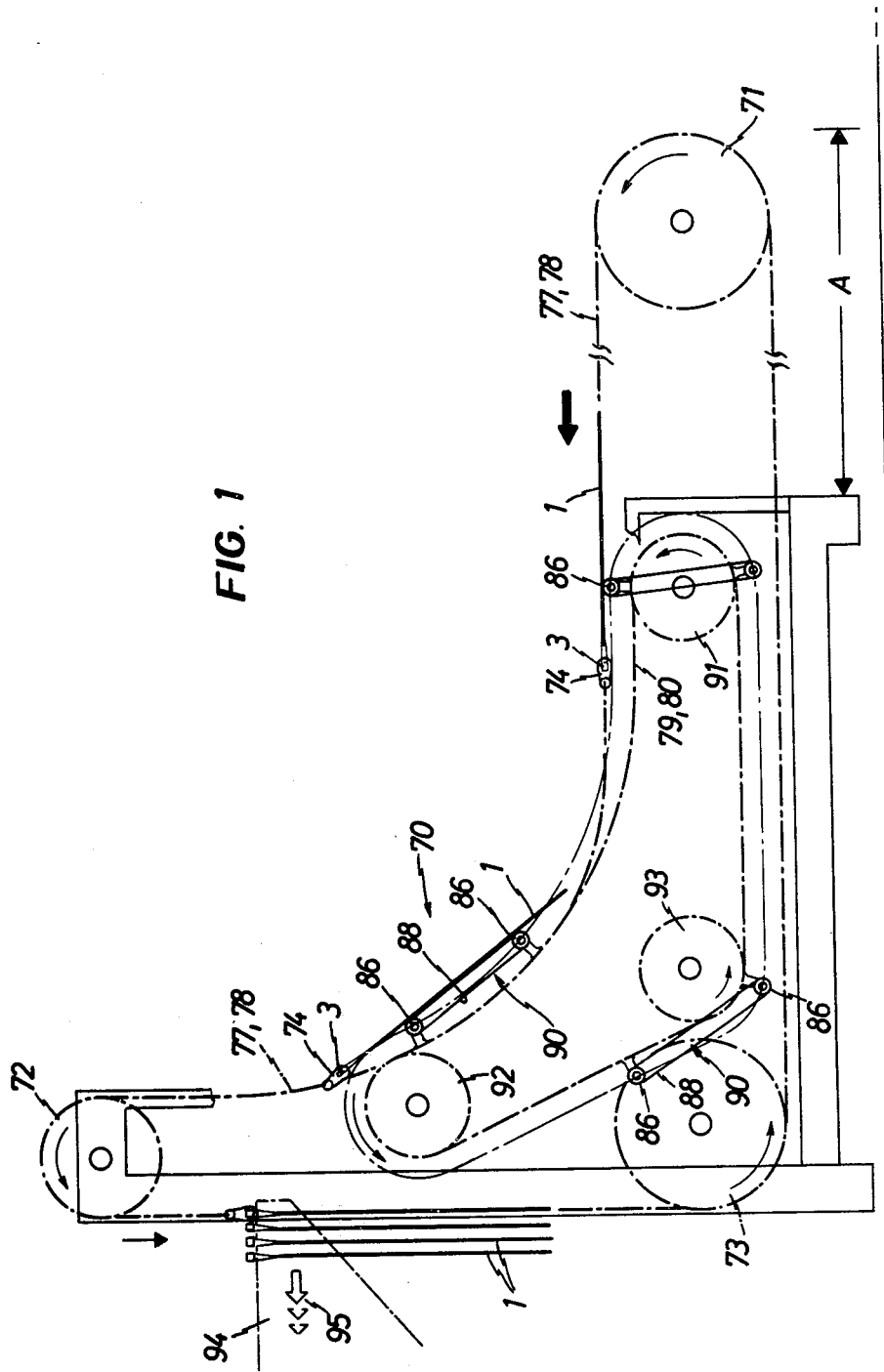
FIG. 1 is a highly diagrammatic side elevation of a first example of embodiment of a machine according to the invention, of which some parts have been broken away in the interests of clarity.
Figure 2:
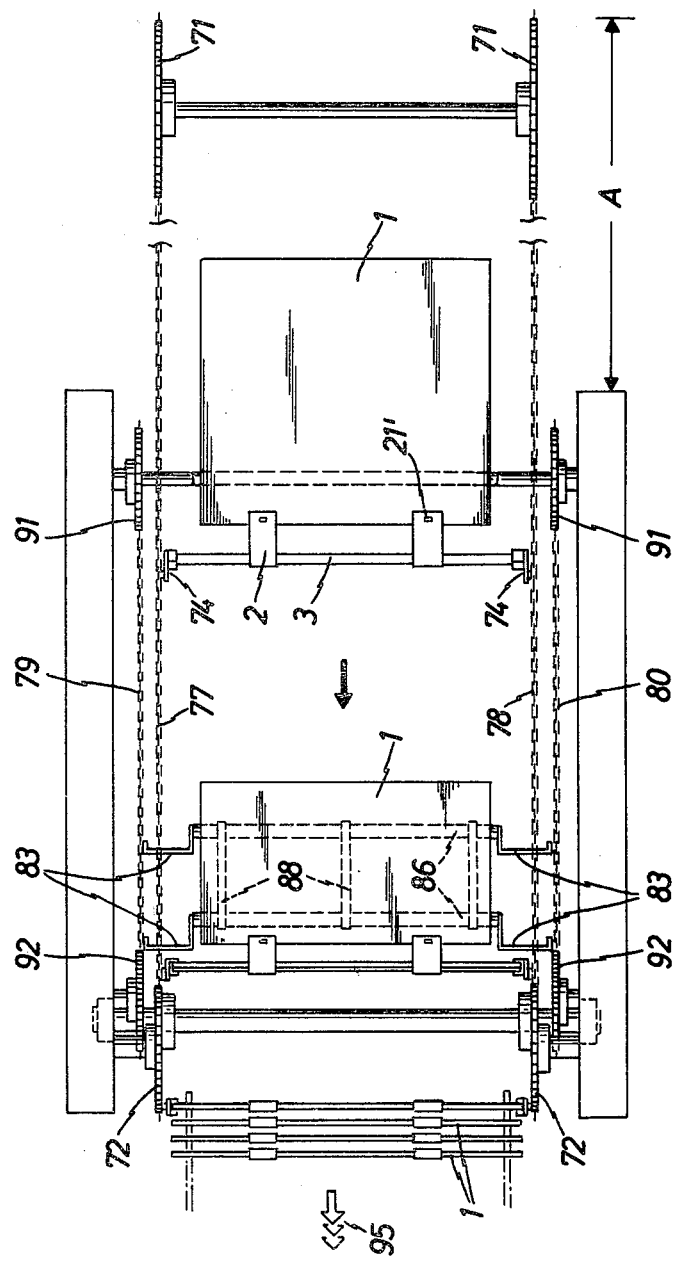
FIG. 2 is a plan view of the machine shown in FIG. 1.
Figure 3:
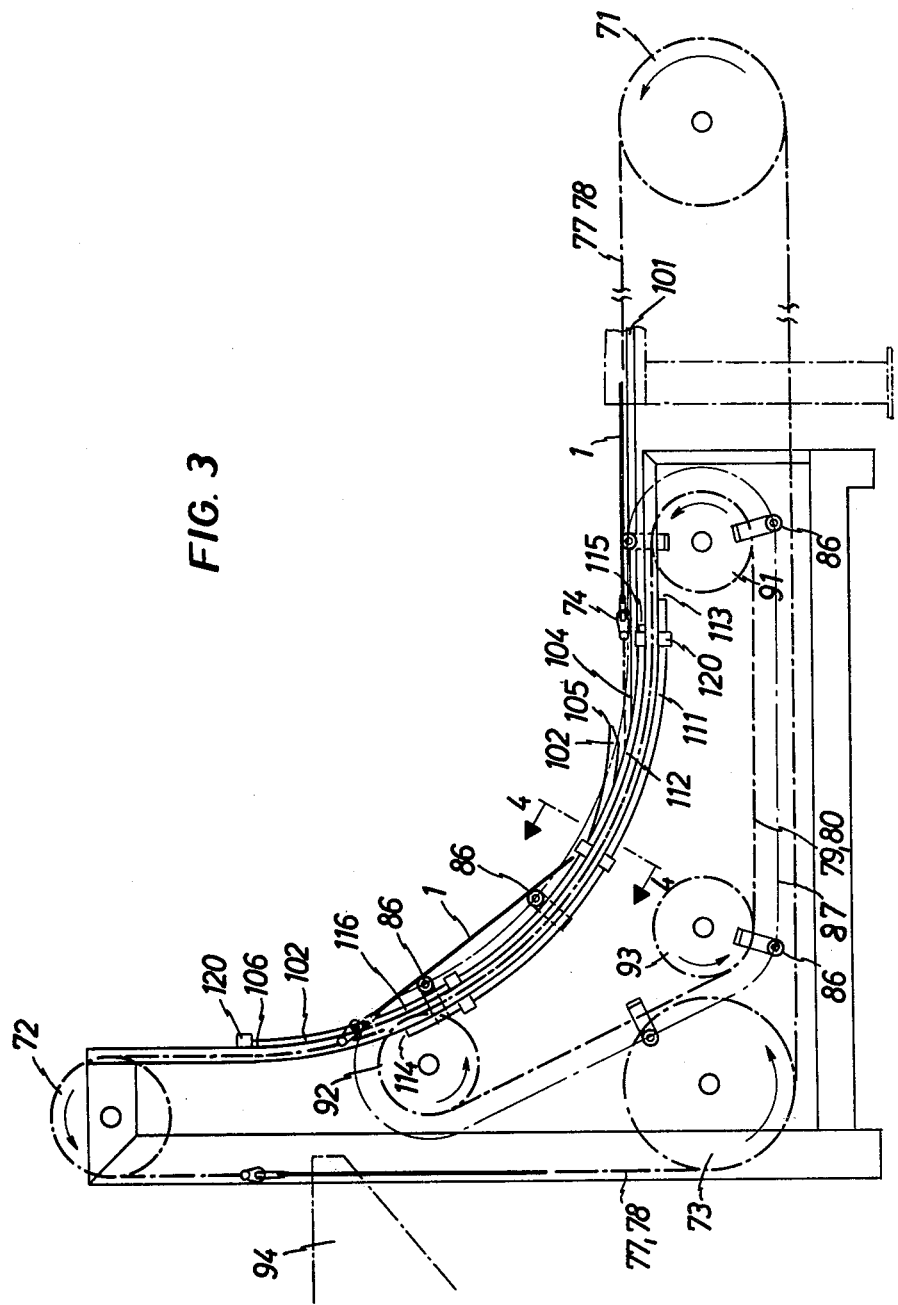

FIG. 3, like FIG. 1, is a side elevation of the left-hand part of the first example of embodiment of the machine according to the invention, showing the guide paths for the chains which were broken away in FIG. 1 in the interests of greater clarity.

Figure 4:
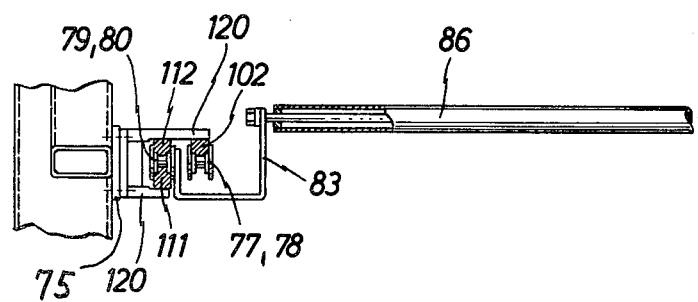

FIG. 4 is an enlarged partial section through the chain guide paths taken along the line 4—4 of FIG. 3.

Figure 5:
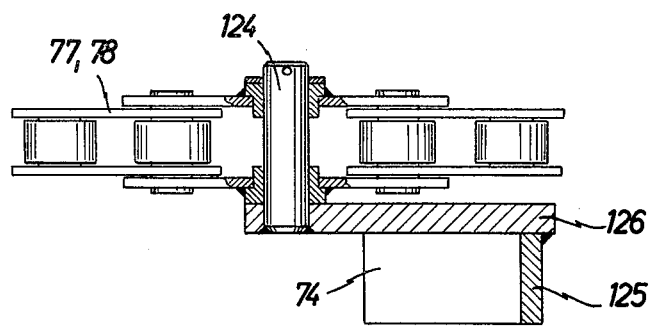

FIG. 5 is an enlarged plan view, partly in section, of a catch for the cathode bars.

Figure 6:
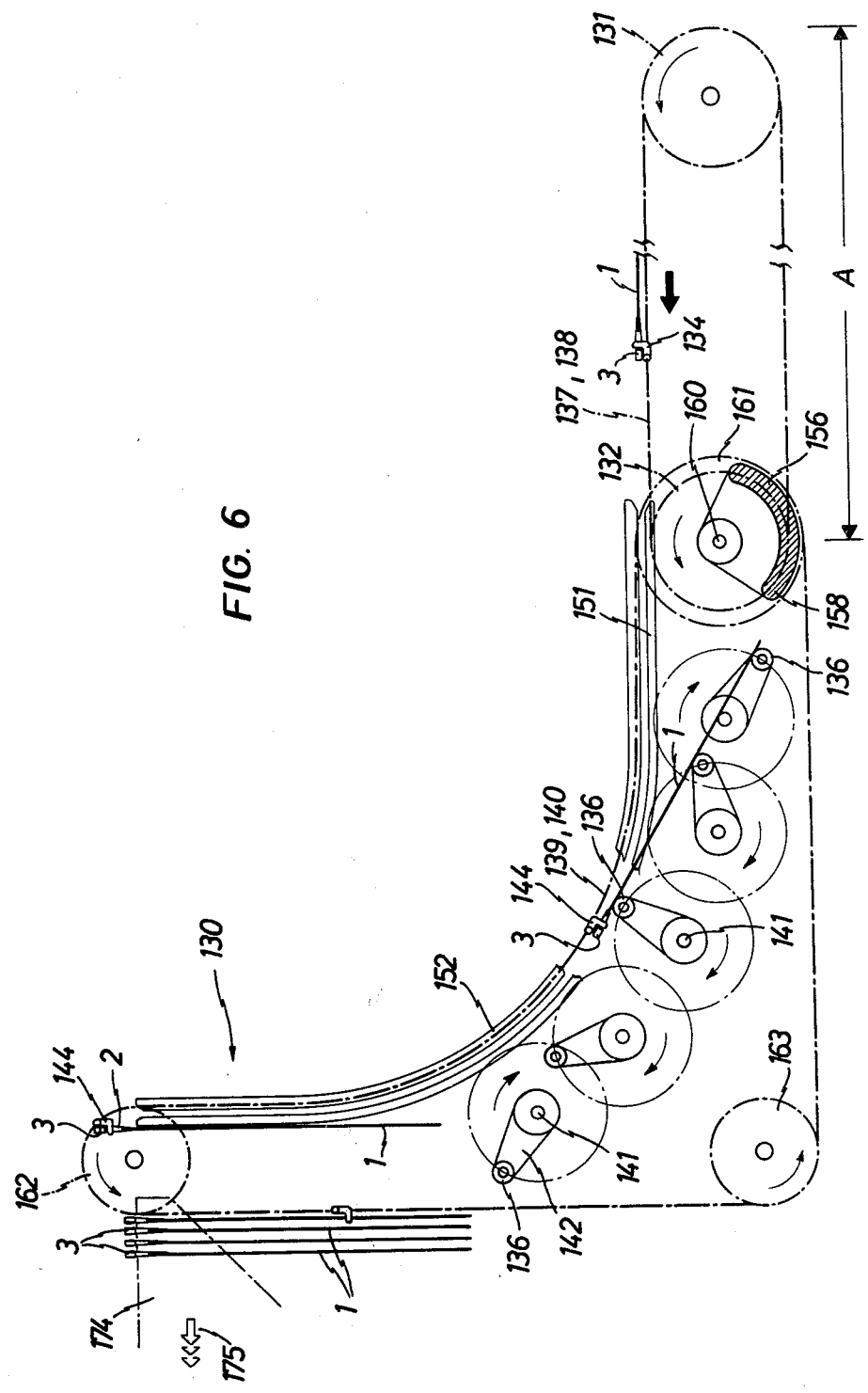

FIG. 6 is a highly diagrammatic side elevation of a second example of embodiment of the machine according to the invention, of which individual parts have been broken away in the interests of greater clarity.

FIG. 7 is a plan view of the machine shown in FIG. 6.

In the first embodiment shown in FIGS. 1 to 5, the starting sheets, which consist of a sheet 1 fixed to a cathode bar 3 by means of two supporting eyes 2 which are joined to the sheet by fixed connections 21' (FIG. 2), are delivered to the raising unit generally denoted by the reference 70 by means of a transporting unit comprising a sprocket wheel 71 and two endless chains 77, 78. The transporting chains 77, 78 represent the main transporting unit provided with catches for the cathode bars for a unit for applying the cathode bars to the sheets which is arranged in the zone A. The unit in the zone A is preferably constructed in the same way as the machine described in German Auslegeschrift No. 2,618,679, published on Aug. 18, 1977, for the continuous mechanical fabrication of starting sheets for the electrolytic refining of metals, particularly copper. According to the invention, the transporting chains 77, 78 are guided to the raising unit 70 over sprocket wheels 72, 73. The catches 74 provided on the transporting chains 77, 78 take up the cathode bars 3 at their ends and, by way of the supporting eyes 2, haul the sheets 1 along an arcuate path of movement from the horizontal position forwards and upwards into the vertical position, the sheet 1 retaining its position relative to the cathode bar 3.

In order largely to prevent the sheets 1 from bending during this raising movement, supports are provided, consisting of rollers 86 fixed on both sides to two endless chain drives 79, 80 by means of supporting stands 83. These chain drives 79, 80 circulate over pairs of sprocket wheels 91, 92, 93, and in the raised position of the semi-finished sheets 1 are guided in accordance with the chain drives 77, 78 for raising the sheets. In order to establish a flat supporting surface for the sheets 1 on the rollers 86, belts 88 may be looped around two adjacent rollers 86. The two chain drives 79, 80 and 77, 78 are interconnected in a force-locking, preferably form-locking, and synchronous manner by a suitable transmission system (not shown). The position of the supports 86 in the form of rollers is selected in consistency with the position of the catches 74 for the cathode bar 3 in such a way that two supporting rollers 86 connected together by a belt 88 to form a carriage 90 always form a flat support for the sheets 1 while they are being raised.

At the output end of the raising unit for the starting sheets, the starting sheets 1 depending freely from the catches 74 are transferred to a stand 94 provided, for example, with a comb-like conveyor unit and are transported step-by-step to the left in the direction of the arrows 95.

As can best be seen from FIG. 3, the chain drive 79, 80 is guided in the same way as the chain drive 77, 78 in the vicinity of its arcuately climbing section. The guide means for the chain drive 77, 78 essentially comprise horizontal guide rails 101 which are arranged below the chains 77, 78 and form a horizontal guide for them. The guide rails 101 also form a horizontal guide for the catches 74. As can best be seen from FIG. 5, the catches 74 are pivotally mounted in the chains 77, 78 by means of a pin 124. The catches themselves are U-shaped, the central web of the U-shaped profile of the catches being shown in section at 125 in FIG. 5. The U-profile of the catches is open to the left in FIG. 5 and welded to a plate 126. Under the effect of gravity, the catches 74 would normally assume a position directed vertically downwards from the pin 124. In the embodiment shown in FIGS. 1 to 5, this is prevented in the upper horizontal region of the chains 77, 78 by the guide rail 101 which supports the plates 126 or rather the catches 74 in such a way that they are kept in the horizontal position shown in FIG. 5 which is open to the left, i.e. in the direction of movement of the chains 77, 78. At the beginning of the climbing section, the lower guide rails 101 terminate at around 104 or slightly above where upper guide rails 102 are provided for the chains 77, 78. However, these guide rails 102 are designed in such a way that they do not stop the catches 74 from pivoting freely relative to the chains 77, 78 in such a way that, when the starting sheets 1 are raised, the catches 74 are able to pivot freely and to align themselves substantially parallel to the starting sheets under the effect of the tractive force applied thereto, as can best be seen from FIG. 1. The upper guide rails 102 for the chains 77, 78 begin at 105 and end at 106.

Lower guide rails 111 and upper guide rails 112 are provided for the chains 79, 80, the lower guide rails beginning at 113 and ending at 114 and the upper guide rails beginning at 115 and ending at 116. The guide rails 101 and 112 extend parallel to one another over a relatively long section, the guide rails 102 being arranged inside and the guide rails 112 outside, as can best be seen from FIG. 4. Since the supporting rollers 86 are connected to the chains 79 and 80 through U-shaped supporting stands 83, no interference occurs. The guide rails 101, 102 and 111, 112 are fixed by means of supports 120 to an arcuate support rail 75 of the machine frame. The path of movement of the central axes of the supporting rollers 86 is shown at 87 in FIGS. 1 and 3.

In the second embodiment illustrated in FIGS. 6 and 7, the unit (not shown) for joining the cathode bars 3 to the sheets 1 is arranged in the right-hand section A of FIG. 6 by way of supporting eyes 2 which are in turn fixed to the sheet by means of fixed connections 21'. This unit may be a continuously operating unit for joining the cathode bar to the sheet like the unit described in German Auslegeschrift No. 2,618,679 for the continuous mechanical fabrication of starting sheets for the electrolytical refining of metals, particularly copper. The main transporting system of the unit for applying the cathode bar 3 comprises the transporting chains 137, 138 which are driven by means of a sprocket wheel 131. The catches 134 of the chains 137, 138 are L-shaped. They may be fixedly connected to a link of the chains 137, 138. However, they are with advantage pivotally mounted on the chains 137, 138 and kept in the horizontal position by means of guide rails (not shown in FIGS. 6 and 7) along the upper flight of the transporting chains 137, 138. The chains 137, 138 are guided over sprocket wheels 132 which are mounted for rotation on the shaft 160. The guides to which reference has just been made may be designed in such a way that, during the circulation of the chains 137, 138 around the sprocket wheels 132, the L-shaped catches 134 are able gradually to pivot from the horizontal position into the vertical position in order to facilitate the release of the cathode bars 3 and their transfer to the catches 144 of the chain conveyor 139, 140. The chain conveyor 139, 140 of the unit for lifting the starting sheets from the horizontal into the vertical position, which is generally denoted by the reference 130, comprises pairs of sprocket wheels 161, 162, 163 which are driven by means of a shaft 160 which is fixedly connected to the sprocket wheels 161.

The chain drives 137, 138 and 139, 140 are interconnected in a force-locking, preferably form-locking, and synchronous manner by a transmission system (not shown) which may consist for example of suitably dimensioned chains and sprocket wheels connecting the shaft 160 to the shaft of the sprocket wheels 131, the transmission ratio of the sprocket wheels being selected in such a way that the chains 137, 138 and 139, 140 preferably travel at more or less exactly the same speed in order to ensure that the cathode bars 3 are transferred without any friction.

Since the catches 144 are open at their lower ends, the cathode bars are supported by means of guide rails 151 in the arcuately ascending region of the raising unit 130. In addition, guide rails 152 are provided for the chains 139 and 140. These guide rails 152 may also be designed in such a way that they support the cathode bars 3 at their upper ends and, in co-operation with the guide rails 151, guide the cathode bar 3 at its upper and lower ends. In the second embodiment shown in FIGS. 6 and 7, just as in the first embodiment, the starting sheets are taken up at the cathode bars and transferred along an arcuate path from the horizontal position into the vertical position in a continuous steady forward and upward movement, the forces applied to the starting sheets being transmitted almost exclusively from the cathode bars through the supporting eyes 2 to the sheet 1 in such a way that the supporting eyes are permanently under a tensile stress. This affords the advantage that the supporting eyes which are pressed resiliently onto the cathode bar are not enlarged while the starting sheets are being raised, thereby preventing any reduction or deterioration in the resilient contact between the supporting eyes 2 and the cathode bar 3.

In order to prevent the sheets from bending while they are being raised, supports are provided, consisting of supporting rollers 136 and, at the entrance to the raising unit 130, of a curved surface 156. The supporting rollers 136 are mounted by way of crank webs 142 on horizontal shafts 141 of crank gears. The shafts 141 of these crank gears lie on a surface which is curved arcuately to correspond to the guide rails 151, 152. The crank gears are interconnected in form-locking manner by means of a gear drive 166 or similar drive and, by way of the drive shaft 160, are driven in synchronism with the chain drives 139, 140 and 137, 138. In this connection, the position of the supports 136, 156 is selected in consistency with the catches 144 for the cathode bars 3 in such a way that a number of supports 136, 156 always aligns with one catch 144 in such a way that the supports 136, 156 form a flat support for the sheets 1 while they are being raised, as shown in FIG. 6. It has been found to be of particular advantage for the curved surface 156 at the entrance to the raising unit 130 to move in the transporting direction of the sheets 1, whilst the supporting rollers 136 move against that direction. The sheets 1 slide down over the rear edge 158 of the curved surface 156. The supporting rollers 136 are preferably mounted for rotation in the crank webs 142 and may be provided with a soft rubber or plastic coating or with a smooth metal surface.

At the output end of the raising unit 130, the starting sheets 1 depending freely from the hooks 144 are transferred to a stand 174 in which they are suspended at uniform intervals from one another. This stand 174 may be provided, for example, with a comb-like transporting unit which, through a corresponding forward and backward movement coupled with an upward and downward movement, transports the starting sheets 1 suspended in the stand 154 step-by-step in the direction of the arrows 175.

In the drawings and in the specification, there have been set forth preferred embodiments of the invention and, although specific terms are employed, they are used in a generic and descriptive sense only and not for the purposes of limitation, the scope of the invention being defined in the claims.

What we claim is:

1. A method for continuously transferring and transporting starting sheets for the electrolytic refining of metals, particularly copper, from a horizontal position into a vertical position for introduction into a stand in which the starting sheets are stored for subsequent suspension at equal intervals in the electrolytic refining baths, comprising the steps of: taking the starting sheets by their cathode bars and advancing them substantially horizontally and then continuously advancing said sheets without an interruption of movement at a substantially constant speed.

2. A method as claimed in claim 1, wherein the step of raising the sheets is performed with the sheets being raised by their cathode bars forwardly and upwardly.

3. A method as claimed in claim 1, characterized in that the step of raising the sheets is performed by a drive means for raising the sheets, said drive means and said support means being operated continuously and in synchronism with a drive for continuously transporting the sheets and cathode bars in the horizontal position to said drive means, said sheets passing continuously from said drive for transporting to said drive means.

4. A method as claimed in claim 1, characterized in that the drive means, support means and drive for transporting are interconnected in form-locking manner.

5. A machine for continuously transferring and transporting starting sheets for the electrolytic refining of metals, particularly copper, from a horizontal position into a vertical position for introduction into a stand in which the starting sheets are stored for subsequent suspension at equal intervals in the electrolytic refining baths, comprising conveying means for horizontally conveying said sheets and then without an interruption of movement continuously advancing the sheets by their cathode bars along a continuously changing path from the horizontal to the vertical, successively raising said sheets over a transition of the path from the horizontal to the vertical, and support means for preventing bending of said sheets during raising thereof, said support means engaging said sheets at several points distributed along their length and being coordinated with the speed at which the sheets are raised so as to provide a flat supporting thereof throughout the entire raising of said sheets from the horizontal to the vertical.

6. A machine as claimed in claim 5; characterized in that the conveyor means comprises moveable supports for the sheets, said moveable supports being carriages fixed on both sides to two endless chain drives.

7. A machine as claimed in claim 6, characterized in that the moveable supports comprise catches shaped in such a way that they release the cathode bars at an output end of the machine after raising of the starting sheets.

* * * * *